(No Model.)

A. B. FOWLER & G. E. WARREN.
SHUTTLE DRIVING MECHANISM FOR SEWING MACHINES.

No. 560,704. Patented May 26, 1896.

Witnesses.
J. R. Snow,
H. P. Guillo.

Inventors
Alfred B. Fowler, and
George E. Warren,
by their attorney,
J. E. Maynadier

United States Patent Office.

ALFRED B. FOWLER AND GEORGE E. WARREN, OF PAWTUCKET, RHODE ISLAND, ASSIGNORS TO THE CAMPBELL MACHINE COMPANY, OF SAME PLACE.

SHUTTLE-DRIVING MECHANISM FOR SEWING-MACHINES.

SPECIFICATION forming part of Letters Patent No. 560,704, dated May 26, 1896.

Application filed May 28, 1894. Serial No. 512,693. (No model.)

*To all whom it may concern:*

Be it known that we, ALFRED B. FOWLER and GEORGE E. WARREN, of Pawtucket, in the county of Providence and State of Rhode Island, have invented a new and useful Shuttle-Driving Mechanism for Sewing-Machines, of which the following is a specification, reference being had to the accompanying drawings, making a part hereof, in which—

Figure 1:
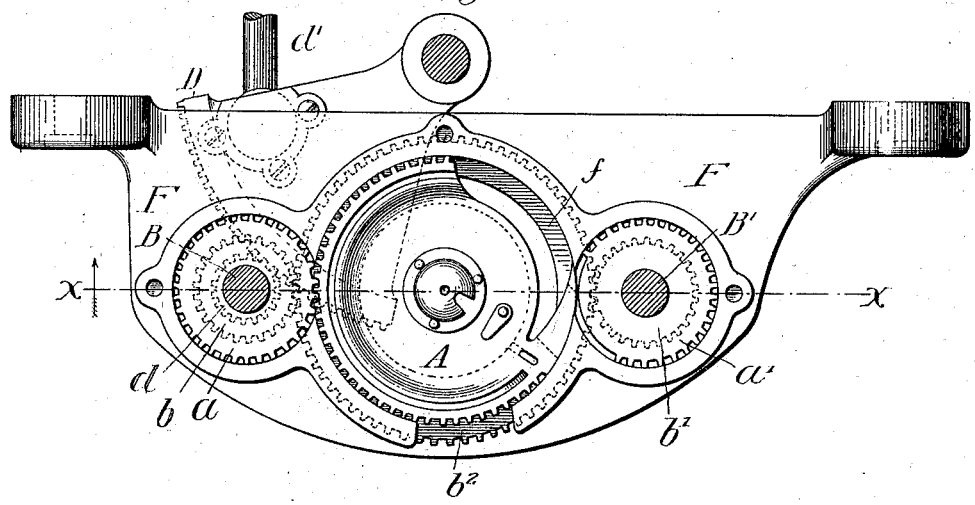
Figure 2:
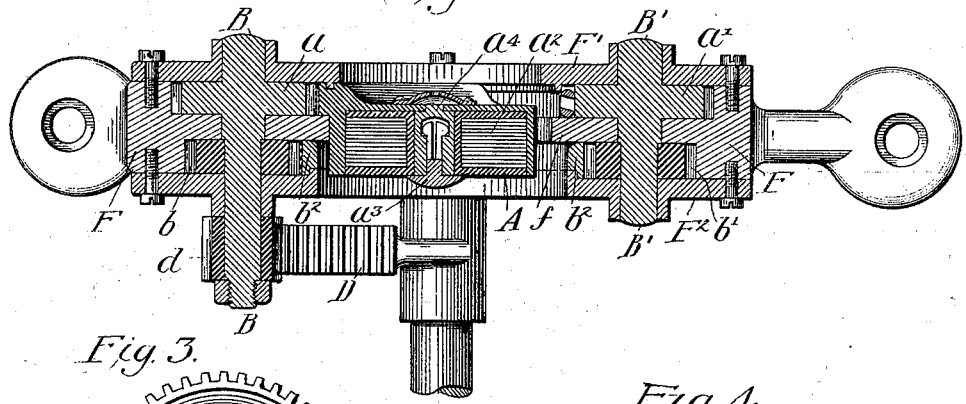
Figure 3:
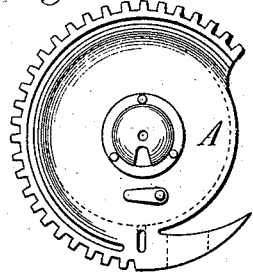
Figure 4:
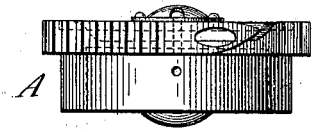

Figure 1 is a plan with the cap removed and partly in section. Fig. 2 is a section on line $x$ $x$ of Fig. 1. Figs. 3 and 4 show the shuttle removed.

In the drawings, A is the shuttle, with teeth on its periphery to engage with the driving-gears $a$ $a'$, by which the shuttle is moved about its axis. The shafts B B', to which the gears $a$ $a'$ are fast, carry also the gears $b$ $b'$, which are connected by the ring-gear $b^2$, so that when either B or B' is turned the other turns in the same direction and to the same extent, and in this way the shuttle-driving gears $a$ $a'$ are always ready to mesh with the teeth in the shuttle, for, as will be clear from the drawings, gear $a'$ is out of mesh at times with the teeth on the shuttle, and if the motion of the shuttle be considered it will be seen that gear $a$ is also out of mesh at times with the teeth.

We prefer to actuate shaft B by means of segment-gear D and pinion $d$, fast to shaft B, and in that form of our invention shown in the drawings this segment-gear is oscillated through connecting-rod $d'$.

The bobbin $a^2$ is held in the shuttle by the spring-stud $a^3$, which engages the post $a^4$, fast to the shuttle A. The shuttle-support F has a circular chamber whose bottom wall $f$ supports the shuttle, as clearly shown in Fig. 2, and the shuttle is held in place in that chamber by means of a rib on cap F', which enters a corresponding groove in the shuttle A. A circular chamber in the other side of support F receives the ring-gear $b^2$, which is held in place by cap $F^2$, as clearly shown in Fig. 2.

The operation is as follows: When the segment-gear D oscillates, it turns shaft B and with it gears $a$ and $b$, and as long as $a$ is in mesh with the teeth in shuttle A that shuttle is moved on its axis, but ring-gear $b^2$, being in mesh with gear $b$, is also driven and in time drives shuttle-gear $a'$, so that when the teeth on shuttle A come into the proper place they mesh with gear $a'$ before unmeshing with gear $a$, and the shuttle A is then driven by both gears $a$ and $a'$, connected by ring-gear $a^2$.

Our invention consists in a new device for supporting, guiding, and driving a shuttle, the device being composed of a frame or casing, the shuttle with gear-teeth in its periphery and supported by its rim in the casing, the two driving-gears meshing with those teeth, and a ring-gear supported by its rim in the casing and connecting the two driving-gears, the whole device being compact, simple, and durable and the ring-gear giving free access for the insertion and removal of the bobbin or thread-case of the shuttle.

We are aware of Patent No. 471,037 to Tracy, dated March 15, 1892, and of British Patent No. 12,795 of 1885, and disclaim all shown therein, for the shuttle-supporting, guiding, and driving devices shown in those patents lack the ring-gear and also the casing supporting that gear and the shuttle, each by its rim, and neither of those patents shows anything resembling the compact arrangement of the shuttle, its driving-gears, and the gear connecting them, supported wholly by its rim, all in a casing which leaves both faces of the shuttle exposed so far as is required for the operation of the needle at one face and the insertion and removal of the thread-case at the other face.

What we claim is—

In combination the shuttle with teeth upon its periphery; the driving-gears; the ring-gear connecting the driving-gears; the casing, chambered to support the shuttle by its rim, and also chambered to support the ring-gear by its rim; all substantially as described.

ALFRED B. FOWLER.
GEORGE E. WARREN.

Witnesses:
DANIEL McNIVEN,
M. E. DOLLOFF.